May 31, 1949.  R. J. KUTZLER ET AL  2,471,821
AIRCRAFT CONTROL APPARATUS
Filed Dec. 30, 1944  2 Sheets-Sheet 2
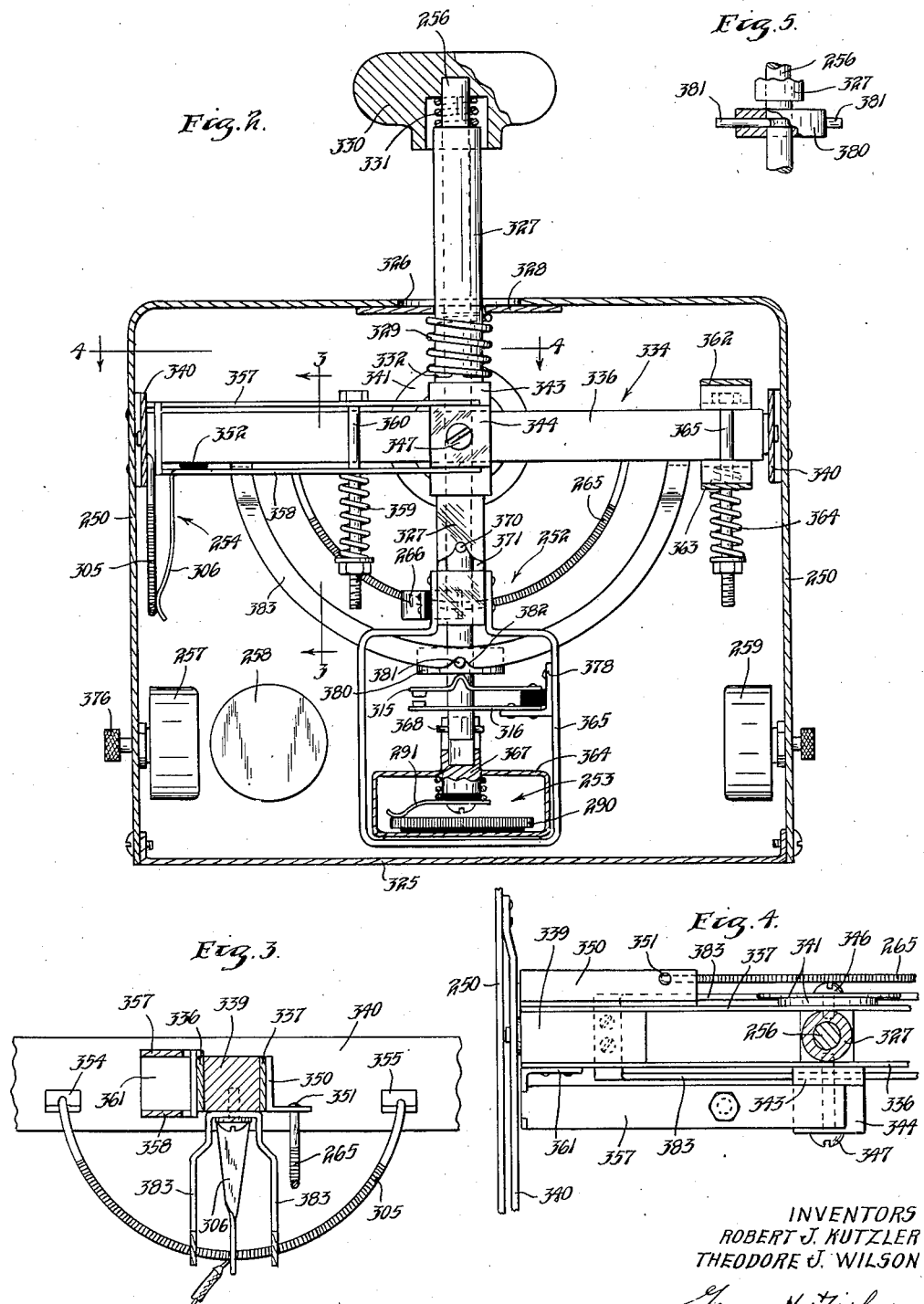
INVENTORS
ROBERT J. KUTZLER
THEODORE J. WILSON
BY George N. Fisher
ATTORNEY Patented May 31, 1949

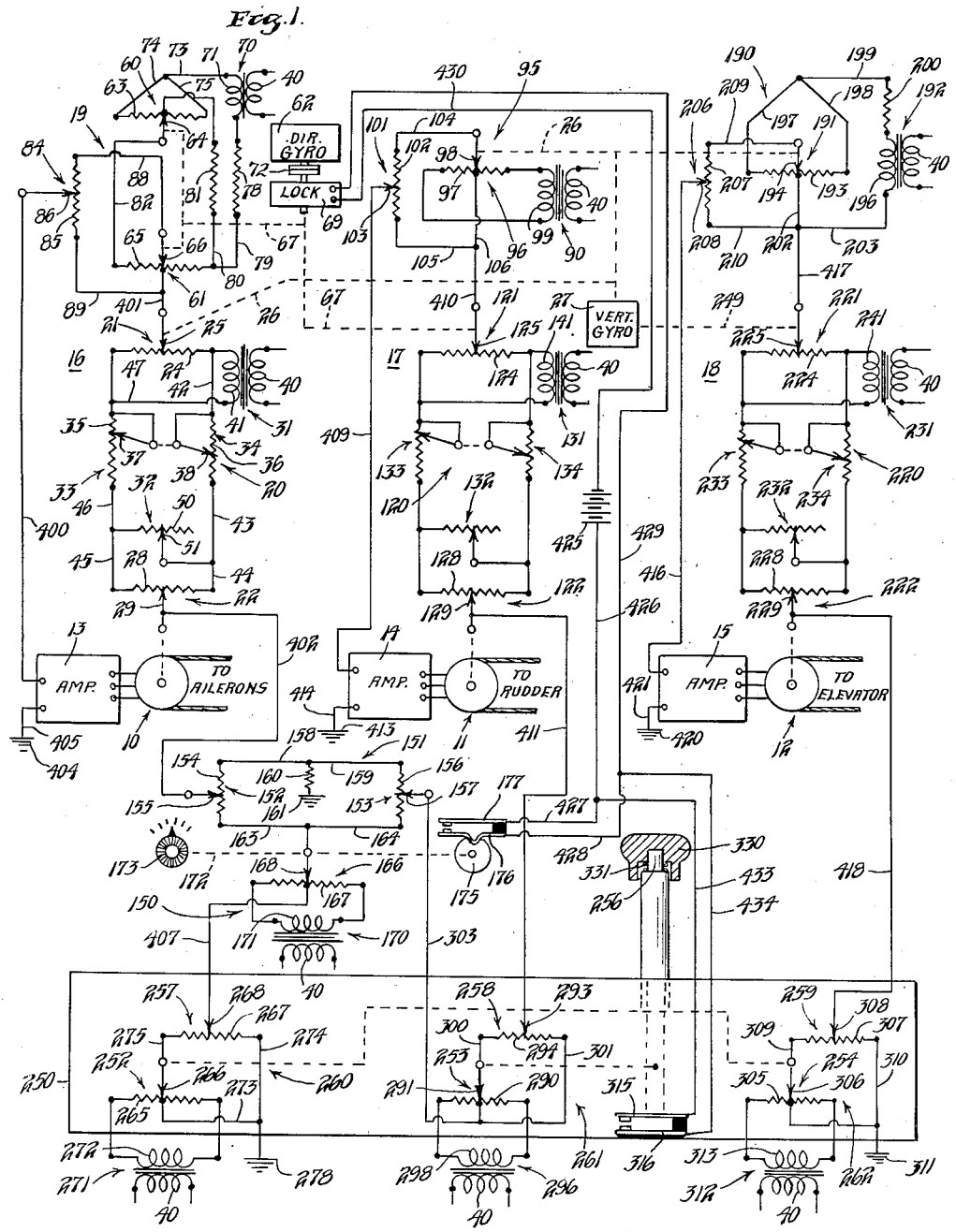

2,471,821

UNITED STATES PATENT OFFICE 2,471,821

AIRCRAFT CONTROL APPARATUS

Robert J. Kutzler and Theodore J. Wilson, Minneapolis, Minn., assignors to Minneapolis-Honeywell Regulator Company, Minneapolis, Minn., a corporation of Delaware Application December 30, 1944, Serial No. 570,712

21 Claims. (Cl. 244—77)

The present invention is concerned with aircraft control apparatus and more particularly with apparatus for manually modifying the action of an automatic flight control system whenever departure of the aircraft from a predetermined course is desired.

In automatic systems for controlling the flight of an airplane, it is necessary to provide some means under the control of the pilot for modifying the direction of flight in either a horizontal or vertical direction or both to permit turning or climbing as desired. It is broadly an object of the present invention to provide such a manually operated means which is convenient to operate and provides a means for readily maneuvering the aircraft with the aid of the automatic control system.

A further object of the invention is to provide such an arrangement in which a tiltable member is provided which upon being tilted in one direction affects the turning of the aircraft and which upon being tilted in a different direction affects the pitch of the aircraft.

A still further object of the present invention is to provide such an arrangement in which upon the manually movable member being moved in one direction both the airfoil surface controlling the direction of flight and that controlling the tilt of the aircraft about its longitudinal axis are operated to place the airplane in a banked turn.

A further object of the invention is to provide a manual control means for an automatic flight control system in which upon the manual control means being released, it automatically returns to the position assumed before the desired operation.

A still further object of the present invention is to provide such a manual control means which when moved in one direction causes the plane to be placed in a banked turn and when moved in another direction to place the plane in a turn without banking.

A still further object of the present invention is to provide in connection with a manually controlled arrangement for modifying the action of an automatic flight control system, means for rendering the direction responsive device temporarily inoperative during a turn and for maintaining the same inoperative for a period of time after the manual control means is restored to its normal position.

A still further object of the present invention is to provide an improved device for selectively operating a plurality of impedance units, depending upon the direction in which a handle is tilted.

A further object of the present invention is to provide a means for manually operating a plurality of potentiometers depending upon the direction of tilt of a handle member.

Other objects of the present invention will be apparent from a consideration of the accompanying specification, claims and drawing, of which Figure 1 is a schematic view of a flight control system employing our improved manual control, Figure 2 is a vertical sectional view of our improved manual control, Figure 3 is a view taken along the line 3—3 of Figure 2 in the direction of the arrows adjacent that line, Figure 4 is a view taken along the line 4—4 of Figure 2 in the direction of the arrows adjacent that line, and Figure 5 is a detailed view partly in section of a portion of the switch actuating mechanism of our manual control.

Referring to the drawing, we have shown in Figure 1, as above noted, a flight control system employing our manual control. In this system, there are three motors 10, 11, and 12 for operating the ailerons, the rudder, and the elevator, respectively. These three motors may be of any conventional type capable of being reversibly controlled by the output of an amplifier. Each of these three motors is connected to amplifiers 13, 14, or 15, respectively. The amplifiers are of any suitable type which are capable of supplying to an output circuit a voltage, the phase relationship of which to a standard source of voltage is dependent upon and reversible with the signal voltage supplied to the amplifier.

Each of the amplifiers 13, 14, and 15 has supplied to it a signal voltage which is derived from an impedance network. The impedance network associated with the amplifier 13 is generally designated by the reference numeral 16, that associated with amplifier 14 by the reference numeral 17, and that with amplifier 15 by the reference numeral 18. These networks will now be described.

Referring first to the network 16 controlling the amplifier 13 which in turn controls the aileron motor 10, the main portion of this network consists of two bridges 19 and 20. The bridge 20 consists of a gyroscopically operated potentiometer 21 and a follow up potentiometer 22. The gyroscopically operated potentiometer 21 consists of a resistor 24 and a slider 25. The slider 25 is connected through a mechanical connection 26

(only schematically shown) to a vertical gyroscope 27. The vertical gyroscope is effective whenever the aircraft in which it is mounted rolls with respect to its longitudinal axis to move slider 25 in one direction or the other with respect to resistor 24, depending upon the direction of roll. The follow up potentiometer 22 likewise consists of a resistor 28 and a slider 29. The slider 29 is operatively connected to the motor 10 to assume a position dependent upon that of the motor.

The bridge including potentiometers 21 and 22 is energized by a transformer 31 and includes centering potentiometers 33 and 34 and a ratio adjusting rheostat 32. The transformer 31 comprises a primary winding 40 and at least one secondary winding 41. The control system of our invention requires the use of a large number of electrically isolated sources of alternating voltage. It is preferable to provide certain of these voltages from separate secondary windings of a single transformer. For convenience in illustration, however, each secondary winding is shown as associated with its individual primary winding. In order to indicate that the windings may all be secondaries of the same transformer, the primary winding of each transformer to be referred to hereinafter will be given the same reference character.

The centering potentiometers 33 and 34 consist of resistors 35 and 36 with which cooperate sliders 37 and 38, respectively. The sliders 37 and 38 are connected together and to any suitable manual operator in such a manner that if the operator is turned, the sliders are moved in opposite directions with respect to their associated resistors. Each of the sliders is connected to the upper terminal of its associated resistor so as to shunt the upper portion of the resistor above the point of contact. Due to the sliders moving in opposite directions, the amount of resistance cut out of one potentiometer will be exactly equal to that connected into another potentiometer.

The resistors 24 and 28 of the gyroscopically operated and follow up potentiometers 21 and 22 are connected in parallel to secondary 41, the connections of resistor 28 to secondary 41 including the resistors 35 and 36 of the centering potentiometer. These last connections are as follows: from the upper terminal of secondary 41 through conductor 42, resistor 36, conductors 43 and 44, resistor 28, conductors 45 and 46, resistor 35, and conductor 47 to the other terminal of secondary 41. Thus, the resistors 35 and 36 of the centering potentiometers and resistor 28 form a series circuit, the effective midpoint of which is dependent upon the position of sliders 37 and 38 of the centering potentiometers. Thus, upon slider 37 being moved upwardly and slider 38 downwardly, the electrical midpoint of the series circuit just referred to is shifted from the center of resistor 28 to a point somewhat to the left of center. Upon sliders 37 and 38 being moved in the opposite direction, the electrical midpoint is shifted to the right.

The ratio adjusting rheostat 32 consists of a resistor 50 and a slider 51. This rheostat is connected in parallel with resistor 28 of follow up potentiometer 22 by conductors 44 and 45. By varying the position of the slider of rheostat 32, the effect of potentiometer 22 relative to the gyroscopic potentiometer 21 is varied.

The bridge 19 consists of two gyroscopically operated potentiometers 60 and 61, both of which are actuated by a directional gyroscope 62. The potentiometer 60 comprises a center tapped resistor 63 and a slider 64. The gyroscopically operated potentiometer 61 comprises a center tapped resistor 65 and a slider 66. The two sliders 64 and 66 are connected together and to the gyroscope 62 by mechanical connections schematically indicated by the reference numeral 67. Controlling the movement of this connection is an electrically operated lock 69 which when energized prevents movement of the connection 67. Interposed between the lock 69 and the gyroscope is any suitable slip friction connection or friction clutch 72 which permits the gyroscope to turn with respect to the craft when the lock 69 is engaged. A transformer 70 comprising a primary winding 40 and a secondary 71 is employed to supply power to bridge 19. The upper terminal of this secondary is connected through conductors 73, 74, and 75 to both terminals of resistor 63. The lower terminal of secondary 71 is connected through a resistor 78, conductors 79 and 80, and a resistor 81 to the center tap of resistor 63. The voltage across secondary 71 is thus impressed between the opposite terminals of resistor 63 and the center tap thereof. The phase of the voltage appearing between the center tap and the slider 64 of potentiometer 60 is not affected by the direction of movement of sliders 64, since both ends of resistor 63 are connected together. The voltage appearing between the two points just mentioned is impressed across the resistor 65, the center tap being connected by resistor 81 and conductor 80, to one terminal of resistor 65 while the slider 64 is connected by conductor 82 to the other terminal of resistor 65.

A trimmer potentiometer 84 comprises a resistor 85 and a slider 86. The resistor 85 is connected between slider 66 of potentiometer 61 and the center tap of resistor 65 by conductors 88 and 89.

It will be noted from the above that the voltage appearing between the center tap and slider 64 of potentiometer 60 is impressed across the resistor 65 of potentiometer 61 and that the voltage between the slider and center tap of the latter potentiometer is in turn impressed across resistor 85. This latter voltage will vary in accordance with the movement of both slider 64 and slider 66. Since these two sliders move together, it will be obvious that the voltage between slider 66 and the center tap of resistor 65 will tend to vary as the square of the movement of sliders 64 and 66 from their normal center position. Due to the resistor 81, this variation is not quite as great as the square of the movement but does vary as an exponential function greater than one. The voltage between the lower terminal of resistor 85 and the slider 86 is thus a portion of this exponential voltage, the magnitude of the portion being determined by the position of slider 86.

Before completing the description of the network associated with the aileron control circuit, network 17 will now be described, since certain elements are connected to both networks 16 and 17.

The network 17 comprises bridges 95 and 120. The bridge 95 comprises a potentiometer 96 having a center tapped resistor 97 and a slider 98. A voltage is impressed across the terminals of resistor 97 by a transformer 99 having a primary winding 40 and a secondary winding 99. The secondary winding is connected to the opposite terminals of resistor 97. There thus appears between the slider and the center tap of the resistor 97 a voltage the magnitude of which is dependent upon the displacement of slider 98 from the center tap and the phase of which is dependent upon the direction of such displacement. A trimming potentiometer 101 comprises a resistor 102 and a slider 103. The upper terminal of resistor 102 is connected by conductor 104 to slider 98 and the lower terminal of resistor 102 is connected to the center tap of resistor 97 by conductors 105 and 106. There is thus impressed across resistor 102 a voltage which is dependent in magnitude and phase upon the extent and direction of displacement of slider 98 from the center tap of resistor 97. A variable portion of this voltage appears between the lower terminal of resistor 102 and the slider 103, the magnitude of this portion depending upon the position of slider 103. The bridge 120 is almost identical to the bridge 20 of the network 16. For that reason, the network and the various elements thereof have been given reference characters 100 higher than the corresponding elements of bridge 20. Thus there is a gyroscopically operated potentiometer 121 having a resistor 124 and a slider 125. Similarly, there is a follow up potentiometer 122 having a resistor 128 and a slider 129. The power is applied to the bridge by a transformer 131 having a primary winding 40 and a secondary winding 141. The centering potentiometers 133 and 134 perform the same function with reference to the bridge circuit as centering potentiometers 33 and 34. Similarly, the ratio adjusting rheostat 132 adjusts the relative effect of the rebalancing potentiometer 122 and the gyroscopically operated potentiometer 121.

The slider 125 of the gyroscopically operated potentiometer 121 is positioned by the directional gyroscope under the control of the lock 69 so that when this lock is released, any deviation of the aircraft from a predetermined direction of flight will cause movement of slider 125 in one direction or the other. The resultant movement of the slider 129 of follow up potentiometer 122 will be in such a direction as to rebalance the bridge.

Associated with each of the two networks 16 and 17 are a plurality of other bridges. Disregarding the bridges in our new manual controller, there is a bridge 150 and a voltage dividing network 151. The voltage dividing network 151 comprises two potentiometers 152 and 153. The potentiometer 152 includes a resistor 154 and a slider 155 while potentiometer 153 includes a resistor 156 and a slider 157. The upper terminals of resistors 154 and 156 are connected together by conductors 158 and 159, and the junction of these conductors is connected through a resistor 160 to ground at 161. The lower terminals of resistors 154 and 156 are connected together by conductors 163 and 164. Slider 155 is connected to the aileron network and slider 157 to the rudder network. The junction of conductors 163 and 164 is connected to the bridge 150. This bridge consists of a manually adjustable potentiometer 166 having a center tapped resistor 167 and a slider 168. A transformer 170 having a primary winding 40 and a secondary winding 171 is employed to impress a voltage across resistor 167. The secondary 171 is connected across the opposite terminals of resistor 167. A slider 168 is positioned through mechanical connecting means 172 by a knob 173. The same mechanical connecting means 172 also extends to a cam 175 which is adapted to position a switch blade 176 adapted to be moved into contact making engagement with a second switch blade 177. Upon the manual knob 173 being turned in either direction away from the central position to move slider 168 in either direction away from its contact with the center tap, the cam 175 is effective to move switch blade 176 upwardly into contact making engagement with switch blade 177. Thus, the switch consisting of switch blades 176 and 177 is closed upon knob 173 being actuated in either direction. The potentiometer 166 is employed as a turn control and is operated when it is desired to make turns without the use of our improved manual controller. As will be explained in more detail later, the operation of this turn control causes the plane to be placed in a properly banked turn with accompanying movement of both the rudder and the ailerons. The potentiometers 152 and 153 are employed to adjust the relative amounts of rudder and aileron movement which take place and hence enable adjustment in order to insure that the turn is properly banked.

The elevator control network 18 will now be considered. This network comprises two bridges 190 and 220. Bridge 190 includes a potentiometer 191 and a transformer 192. The potentiometer 191 consists of a center tapped resistor 193 and a slider 194. The transformer 192 comprises a primary winding 40 and a secondary winding 196. The two terminals of center tapped resistor 193 are connected together and to the upper terminal of secondary 196 by conductors 197, 198, and 199 and resistor 200. The center tap of resistor 193 is connected by conductors 202 and 203 to the lower terminal of secondary 196. The voltage of secondary 196 is thus impressed between the center tap and either terminal of resistor 193. Movement of slider 194 in either direction away from the center tap causes a voltage to appear between the center tap and the slider which is not affected in phase by the direction of displacement of the slider from the center tap.

A potentiometer 206 consists of a resistor 207 and a slider 208. The opposite terminals of the potentiometer 206 are connected to the slider 194 and to the center tap of resistor 193 by conductors 209, 210, and 202. There is thus impressed across the resistor 207 a voltage which is dependent in magnitude but not in phase upon the displacement of slider 194 from the center tap. The slider 194 is operatively connected through the mechanical connections 26 to the vertical gyroscope 27 and is operated whenever the ship rolls about its longitudinal axis. The voltage across resistor 207 is thus dependent upon the magnitude but not the direction of roll.

The bridge 220 is very similar to the bridge 120 and hence has been given a reference numeral 100 higher than that employed in connection with bridge 120. The various elements of the bridge likewise have been given reference characters 100 higher than the corresponding elements of bridge 120. Thus, there is a gyroscopically operated potentiometer 221 having a slider 225 and a resistor 224. There is a follow up potentiometer 222 having a resistor 228 and a slider 229. The bridge is energized by a transformer 231 having a primary winding 40 and a secondary winding 241. Centering potentiometers 233 and 234 and the ratio rheostat 232 perform the same relative functions in the bridge as in bridges 20 and 120.

In the case of gyroscopically operated potentiometer 221, the slider 225 is operated by the vertical gyroscope through a mechanical connection 249. This connection is effective to cause the slider to be moved whenever the plane tilts about a transverse axis; that is, whenever the plane changes its pitch.

Follow up potentiometer slider 229 is connected to the elevator motor 12 and is operated whenever the motor 12 is energized as a result of unbalance of the network. The effect of the movement of slider 229 is to tend to rebalance the network.

Our manual controller will now be described. This controller is shown in detail in Figures 2 to 5, being shown schematically at the bottom of Figure 1. The controller will first be described as far as the schematic showing of Figure 1 is concerned. Located within a housing 250 are a plurality of potentiometers 252, 253, and 254. These three potentiometers are designed to be operated by a manually tiltable member 256. The potentiometer 252 is actuated when the member 256 is tilted in one direction, the potentiometer 254 when number 256 is tilted in a second direction, and potentiometer 253 when the member 256 is rotated about its longitudinal axis.

Also included within the housing 250 are a plurality of potentiometers 257, 258, and 259. These potentiometers are employed as trimming potentiometers to adjust the effect of potentiometers 252, 253, and 254, respectively. The potentiometers 252 and 257 form part of a bridge 260, the potentiometers 253 and 258 part of a bridge 261, and the potentiometers 254 and 259 part of a bridge 262. The potentiometers in these various bridges will now be described in detail.

Referring to bridge 260, the potentiometer 252 consists of a center tapped resistor 265 and a slider 266. The potentiometer 257 consists of a resistor 267 and a slider 268. A transformer 271 supplies power to the bridge, this transformer consisting of a primary winding 40 and a secondary winding 272. The opposite terminals of secondary winding 272 are connected to the opposite terminals of resistor 265. The center tap of resistor 265 is connected by conductors 273 and 274 to one terminal of resistor 267 while the slider 266 is connected by a conductor 275 to the other terminal of resistor 267. There is thus impressed across resistor 267 a voltage corresponding in phase and magnitude to the displacement of slider 266 from the midpoint of resistor 265. The right hand terminal of resistor 267 is connected by conductor 274 to ground at 276. There is thus impressed between the slider 268 and ground a voltage which is dependent in magnitude upon the position of slider 268 and dependent in magnitude and phase upon the amount and direction of displacement of slider 266 from the mid-position of resistor 265.

Referring now to the details of bridge 261, the potentiometer 253 comprises a center tapped resistor 290 over which moves a slider 291. Potentiometer 258 consists of a slider 293 movable over a resistor 294. A transformer 296 is employed to energize the bridge 261. This transformer comprises a primary winding 40 and a secondary winding 298, the opposite terminals of secondary winding 298 being connected to the opposite terminals of resistor 290. The slider 291 of potentiometer 253 is connected to the left hand terminal of resistor 294 by conductor 300. The center tap of resistor 290 is connected to the right hand terminal of resistor 294 by conductor 301. The voltage which appears between slider 291 and the center tap of the resistor 290 upon displacement of slider 291 in either direction is thus impressed upon resistor 294. The right hand terminal of resistor 294 is connected by conductors 301 and 303 to the slider 157 of the trimming potentiometer 153. There thus appears between this slider 157 and the slider 293 a voltage which is dependent in magnitude upon the position of slider 293 and is dependent in magnitude and phase upon the extent and direction of displacement of slider 291 from the midpoint of resistor 290.

Referring now to the bridge 262, the potentiometer 254 like potentiometers 252 and 253 comprises a center tapped resistor 305 over which moves a slider 306. The potentiometer 259 comprises a resistor 307 over which moves a slider 308. The left hand terminal of resistor 307 is connected to the slider 306 by conductor 309 and the right hand terminal is connected to the center tap of resistor 305 by conductor 310. The bridge is energized by a transformer 312 having a primary winding 40 and a secondary winding 313. The secondary winding is connected across the opposite terminals of resistor 305 so that upon any movement of slider 306 in either direction, a voltage appears between the slider and the center tap. Thus again, the voltage appearing between the center tap and the slider is impressed across resistor 307. The right hand terminal of resistor 307 is connected by conductor 310 to ground at 311. There thus appears between slider 308 and ground a voltage which corresponds in magnitude to the position of slider 308 and in magnitude and phase to the extent and direction of the displacement of slider 306 with respect to its mid-position.

Our manual controlling apparatus also comprises a switch consisting of switch blades 315 and 316. Switch blade 315 is associated with the manually positionable member 256 in such a manner that when this member is depressed, switch blade 315 is moved into engagement with switch blade 316. This switch is connected in parallel with the switch consisting of switch blades 176 and 177 and controls the energization of the lock 69 for the gyroscope previously described.

Before proceeding further with a description of the operation of the system as a whole, the mechanical details of our manual controller will now be described. Referring to Figure 2, the rectangular case 250 is shown as a case having a removable bottom 325 and an aperture 326 centrally disposed in the upper portion thereof. Extending through this aperture is the rod 256 previously referred to. Surrounding this rod is a sleeve 327 which is surrounded by a disk 328 spring pressed into engagement with the under side of the housing by a spring 329. The disk 328 serves to provide a seal and yet permit sidewise movement of the member 256 and the sleeve 327. A knob 330, shown partly in section, is secured to the upper terminal of the member 256. A spring 331 is interposed between the upper end of sleeve 327 and knob 330 and urges the latter upwardly. The upper portion of the sleeve 327 is cylindrical in cross section while the lower portion beginning at point 332 is square in cross section. This square portion of the sleeve 327 is pivotally mounted upon a rockable member indicated in its entirety by the reference numeral 334. The rockable member 334 comprises two bar members 336 and 337 which are supported in spaced relation by interposed blocks 339 at each end thereof. Only one such block is shown, this being illustrated in Figure 4. The blocks 339 are journaled at their opposite ends to a bracket member 340 secured at several spaced points to the housing 250. The rectangular portion of sleeve 327 extends between the bars 336 and 337 as best shown in Figure 4. Disposed on the outside of bar 337 are a plurality of washers 341, and disposed on the outer side of member 336 is a block 343 which has a portion 344 of square cross section. The assemblage consisting of block 343, sleeve 327, and washers 341 is fastened together by a plurality of screws 346 and 347. These screws extend into the sleeve 327 but do not enter the tiltable member 256 since it is essential that the latter member both reciprocate and rotate with respect to the sleeve member 327. The screws 346 and 347, furthermore, extend freely through bar members 336 and 337 to permit rocking of members 256, 327, and 343 with respect to bar members 336 and 337. It will be seen from the above that members 256 and 327 are pivotally secured to the rockable member 334 so that upon knob 330 being moved in the plane of the drawing, member 256 and sleeve 327 are rocked without affecting the position of rockable member 334. If, on the other hand, the knob 330 is moved in a direction at right angles to the plane of the drawing, the rockable member 334 is rocked.

The potentiometers 252 and 254 are designed to be selectively actuated by movement of knob 330 depending upon the direction in which it is moved. Referring first to the potentiometer 252, the slider 266 is secured to the lower portion of sleeve 327. The resistor 265 is mounted at its opposite ends to the rockable member 334. Referring to Figure 4, it will be noted that a bracket 350 is secured to the bar 337 and the left hand end of resistor 265 passes through this bracket at 351 and is suitably fastened thereto. A similar bracket is provided at the opposite end of bar 337.

Referring now to the potentiometer 254, the slider 306 is secured to the block 339 as best indicated in Figures 2 and 3, an insulated washer 352 being interposed between the slider and the block. As best indicated in Figure 3, the opposite ends of resistor 305 are secured to bracket members 354 and 355 which in turn are secured to the main bracket member 340. It will be obvious that when the knob 330 is rotated in a direction transverse to the plane of the paper so as to move rocker 334, the slider 306 will move with respect to resistor 305. If the knob is not moved in the plane of the paper, the slider 266 will not move with respect to resistor 265, the slider 266 and resistor 265 rocking as a unit about the axis of rockable member 334. If, on the other hand, the knob 330 is moved in the plane of the paper without any movement in a direction transverse to the plane of the paper, the slider 266 will be moved with respect to resistor 265 without any accompanying movement of slider 306 with respect to resistor 305. If the knob 330 is moved in neither of the planes discussed but is moved so as to tilt the member 256 in some other direction, both potentiometers 252 and 254 will be adjusted by relative amounts varying with the relative components of movement of member 256 in the plane of the paper and at right angles to the plane of the paper, respectively.

It is desirable that regardless of what direction the handle 330 is tilted, it returns automatically to center position as soon as it is released. We have accordingly provided spring means for accomplishing this. Referring first to the tilting of the members 256 and 327 without an accompanying movement of the rockable member 334, it will be recalled that member 343 is described as having a portion 344 rectangular in cross section. Bearing upon this portion 344 are two bars 357 and 358 which are spring pressed together by a spring 359 and are pivotally supported at their one end by a bracket 361 secured to bar 358, as best shown in Figure 4. The spring 359 surrounds a bolt 360 which extends loosely through the two bars 357 and 358. By adjusting the nut of the bolt, the tension exerted upon bars 357 and 358 by spring 359 can be varied. It will be obvious that the tendency of bars 357 and 358 by reason of the tension exerted upon them by spring 359 is to tend to resist turning of the portion 343 and hence of the tiltable member 256 and the surrounding sleeve member 327.

A similar biasing arrangement is provided in connection with the rockable member 334. In this case, the two bars are indicated by the reference numerals 362 and 363. They are spring pressed together by a spring 364 surrounding a bolt 365. The free ends of these members bear against a block at the right hand end of the rockable member corresponding to block 339 at the left hand end. It will be apparent from the previous description of the biasing means comprising members 357 and 358 that the effect of the last described biasing means will be to maintain the rocker 334 in the position shown.

The potentiometer 253 is actuated upon rotation of the manually movable members 256. This potentiometer is located within a housing 364 which is carried by a bracket member 365 secured to the lower portion of sleeve member 327 so as to be movable with sleeve member 327. The slider 291 is secured to the end of a cylindrical member 367 connected by a splined connection 368 to the lower end of tiltable member 256. Thus, any rotation of the tiltable rod 256 will cause movement of slider 291 relative to the circular resistor 290. A pin 370 is secured to the rod 256 and projects outward through triangular opening 371 in the sleeve member 327. The effect of the biasing spring 331 is to tend to cause pin 370 to normally occupy a position at the apex of the triangular opening. This tends to maintain the slider 291 in a central position with respect to potentiometer 290 corresponding to that shown in Figure 1. The pin and slot 371 tend to perform a further function which will be described in the next paragraph.

It is an important feature of our invention that the switch blade 315 is moved into engagement with switch blade 316 either by manually depressing the rod 256, by rotation of knob 330 about its longitudinal axis, or by movement of the knob 330 in such a direction as to move slider 266 of potentiometer 252 away from its central position. As will be apparent from Figures 2 and 5, the switch blades 315 and 316 are mounted suitably insulated from each other upon a bracket 378 secured to the bracket member 365. Bearing against a cam follower portion of switch blade 315 is a collar 380 which is journaled upon the rod 256 so as to be freely rotatable but longitudinally fixed with respect to the rod. This collar 380 carries pins 381 which extend into a groove in rod 256 to rotatably secure collar 380 thereto. Pins 381 cooperate with a pair of cam members 383 which are secured to the rocker member 336 as best indicated in Figure 3. The cam members 383 are provided with recesses 382 in which the pins 381 normally rest. Upon tilting of rod 256 in the plane of the paper to move slider 266 with respect to resistor 265, the pins 381 must travel out of the recesses 382 on to the circular portion of the cams 383. In doing so, the collar 380 is forced downwardly, pressing switch blade 315 into engagement with switch blade 316. This, of course, causes closure of the switch constituted by the switch blades. If instead of knob 330 being tilted in the plane of the paper, the knob is rotated, the collar 380 merely rotates with respect to rod 256 and does not ride upon the lowermost portion of the cam surfaces of cams 383. The effect of this rotation does, however, cause pin 370 to be forced downwardly by reason of its cooperation with the walls of the triangular opening 371. This downward movement of shaft 256 in turn causes downward movement of collar 380 to effect movement of the switch blade 315 into engagement with switch blade 316. Thus upon rotation of knob 330 to actuate slider 291 with respect to resistor 290, the switch blades 315 and 316 are moved into contact making engagement. If at any other time it is desired to close switch blades 315 and 316, it will be obvious that downward pressure exerted on knob 330 will push the rod 256 downwardly, forcing collar 380 against switch blade 315 to move it into contact making engagement with switch blade 316. Thus, whenever slider 266 is moved with respect to resistor 265 or slider 291 is moved with respect to resistor 290, the switch consisting of blades 315 and 316 is closed. At other times, it may be closed by depressing knob 330.

The three potentiometers 257, 258, and 259 for adjusting the effect exerted by potentiometers 252, 253, and 254 are secured to the side of the housing 250 and as shown in connection with potentiometers 257 and 259 are provided with shafts extending through the housing. Referring to potentiometer 257, a knob 376 is secured to the outer end of the shaft to permit adjustment of this potentiometer. A similar knob is provided in connection with each of the other potentiometers. If desired, a screw driver adjustment may be substituted for the knob.

*Operation of system*

In general, the amplifiers 13, 14, and 15 associated with the aileron motor 10, the rudder motor 11, and elevator motor 12, respectively, are subject to input voltages which are determined by the networks associated with these amplifiers. As has been indicated by the preceding description of these networks, each of the networks comprises a rebalancing potentiometer and various potentiometers responsive to different conditions. Upon any one of these conditions being changed as a result of a change in the attitude of a ship, one or more of the networks is unbalanced to cause movement of one or more of the motors. The movement continues until such time as the networks are rebalanced, partly by action of the rebalancing or follow up potentiometers. This action will now be described in more detail.

With the various elements in the position shown in the drawing, no potential is impressed upon the input circuits of amplifiers 13, 14, and 15. Referring first to the aileron amplifier 13, a series circuit can be traced from the upper terminal of this amplifier through conductor 400, slider 86, the lower portion of resistor 85, conductors 89 and 401, slider 25, through the bridge 20 to slider 29, conductor 402, slider 155, the upper portion of resistor 154, conductor 158, resistor 160, ground connections 161 and 404, and conductor 405 to the lower terminal of amplifier 13. It is to be noted that this circuit included the lower portion of resistor 85, the bridge 20, and the upper portion of resistor 154. As previously explained, there is impressed across the lower portion of resistor 85 a potential which is dependent upon the position of slider 86 and dependent in magnitude and phase upon the deflection of sliders 64 and 66 from their mid-positions. Since these sliders are in their mid-positions, no voltage is impressed across resistor 85 and consequently there is no voltage between the slider 86 and the lower terminal of resistor 85. Similarly, the sliders 25 and 29 of potentiometers 21 and 22 are each in their mid-positions so that bridge 20 is balanced (assuming sliders 37 and 38 to be in their mid-position) and no voltage appears across the terminals of this bridge. The resistor 154 is connected in a series circuit as follows: from ground 278 through conductor 274, the right hand portion of resistor 267, conductor 407, resistor 167, slider 168, conductor 163, resistor 154, conductor 158, resistor 160, and ground connection 161. It will thus be seen that resistor 154 has impressed upon it a voltage equivalent to the combined unbalance voltages of bridges 150 and 260. As previously explained, the existence of an output voltage at either of these bridges is dependent upon the displacement of either slider 168 or slider 266 from its mid-position. Since in both cases the sliders are shown in their mid-positions, no voltage appears across these bridges and consequently no voltage is impressed across resistor 154. Consequently, the total voltage impressed upon amplifier 13 has a value of zero.

Referring now to the rudder amplifier 14, a circuit may be traced from the upper terminal of this amplifier through conductor 409, slider 103, the lower portion of resistor 102, conductors 105 and 410, slider 125, through the bridge 120, slider 129, conductor 411, slider 293, the right hand portion of resistor 294, conductors 301 and 303, slider 157, the upper portion of resistor 156, conductor 159, resistor 160, ground connections 161 and 413, and conductor 414 to the lower terminal of the amplifier. It will be seen that these connections include the lower portion of resistor 102, the bridge 120, the bridge 261, and the upper portion of resistor 156. Since slider 98 is at its mid-position with respect to the resistor 97, no voltage is impressed upon resistor 102 and consequently none appears between the slider 103 and the lower terminal thereof. Similarly, assuming that the centering potentiometers 133 and 134 are in their mid-positions, no potential exists across bridge 120. Since slider 291 is centered with respect to resistor 290, no potential exists across bridge 261. The resistor 156 is connected in a series circuit extending from ground connection 278 through conductor 274, the right hand portion of resistor 267, conductor 407, resistor 167, slider 168, conductor 164, resistor 156, conductor 159, resistor 160, and to ground at 161. Thus, resistor 156 is connected in series with bridges 166 and 260 just as was resistor 152. As previously noted, no voltage appears across either of these bridges so that no voltage appears across resistor 156. Consequently, no voltage is impressed upon the input of amplifier 14.

Considering now the elevator amplifier, a series circuit may be traced from the upper terminal of this amplifier through conductor 416, slider 208, the lower portion of resistor 207, conductors 210 and 417, slider 225, the bridge 220, slider 229, conductor 418, slider 308, the right hand portion of resistor 307, conductor 310, ground connections 311 and 420, and conductor 421 to the lower terminal of the amplifier. Again, the voltage across the terminals of the amplifier would include any voltage between slider 208 and the lower terminal of resistor 207, the unbalance voltage, if any, of bridge 220, and the unbalance voltage of bridge 262, if any. Since slider 194 is centered with respect to resistor 193, no voltage appears across resistor 207. Similarly, bridges 220 and 262 may be assumed to be balanced.

Under these balanced conditions, now let it be assumed that the plane changes its course slightly from that intended. This will cause the directional gyroscope 62 acting through the mechanical connection 67 to move sliders 64, 66, and 125 with respect to their associated resistors. Let it be assumed that all of these movements occur to the right. The movement of slider 64 to the right will cause a voltage to appear between slider 64 and the center tap, and this voltage, as previously explained, will be impressed upon resistor 65. There will thus be impressed upon resistor 85 a voltage which is a portion of the voltage between slider 64 and the center tap of resistor 63, depending upon the position of slider 66. As previously explained, since sliders 64 and 66 are simultaneously moved, the voltage appearing across resistor 85 is an exponential function of the movement of sliders 64 and 66. While both ends of resistor 63 are connected together so that the voltage between slider 64 and the center tap of resistor 63 is not affected in phase by the direction of displacement of slider 64, the direction of displacement of slider 66 does affect the phase of the voltage between slider 66 and the center tap. Hence, the voltage appearing across resistor 85 will be a function not only of the extent of displacement of sliders 64 and 66 but also of the direction of such displacement. Let it be assumed that throughout the description which follows, the operation is being considered during a half cycle in which the left hand terminals of all potentiometers directly connected to a secondary winding are positive with respect to their midpoints. It is, of course, understood that this condition will immediately reverse during the next half cycle but by considering the operations during a given half cycle, it is possible to readily determine the phase relationships between the various unbalance voltages. Assuming these conditions, the effect of the movement of sliders 64 and 66 just discussed is to render the left hand terminal of resistor 65 positive with respect to the right hand terminal. The movement of slider 66 thus impresses across resistor 85 a voltage which causes the lower terminal of resistor 85 to be positive with respect to the upper terminal. This in turn causes a voltage of a certain phase to be impressed upon motor 10 to cause movement of slider 29 to the right and a corresponding movement of the ailerons to bank the plane in a predetermined direction necessary to effect a turn of the aircraft in a manner to restore the plane to its predetermined course. The movement of slider 29 to the right tends to rebalance the network and hence stop the operation of the motor when the aileron position corresponds to the deviation of the gyroscope. This is the case because movement of the slider 29 to the right tends to cause slider 25 to become positive with respect to slider 29. As previously explained, the signal which initiated the turning of the ailerons was one which tended to raise the potential of the lower end of resistance 85 with respect to slider 86. Hence, the voltage introduced into the circuit between the amplifier terminals by the movement of slider 29 opposes that introduced by reason of the deflection of sliders 64 and 66 of the directional gyroscope potentiometers 60 and 61.

Were the action which has been described so far the only action which occurred, the aileron would be deflected and the plane would continue to bank more and more until the direction was restored. However, it is desired to restore the ailerons to their streamlined position as soon as the plane is in the proper degree of bank. This is accomplished by the action of the vertical gyroscope 27. As soon as the plane enters a bank, the slider 25 is moved by the vertical gyroscope 27. This movement of slider 25 is towards the left so as to tend to cause slider 25 to become positive with respect to slider 29. In other words, the signal introduced by movement of slider 25 opposes the signal introduced into the directional gyroscopic potentiometers 60 and 61 by movement of sliders 64 and 66. Thus, a signal of opposite phase is supplied to the amplifier 13 so as to cause motor 10 to rotate in the opposite direction. This in turn causes movement of slider 29 of the rebalancing potentiometer back towards its center position corresponding to the streamlined position of the ailerons. All of these actions occur rather quickly so that shortly after the directional gyroscope has deflected sliders 64 and 66, the ailerons will have been moved to bank the plane and then will have been moved back so as to bring slider 29 back to the mid-position. The system will be balanced by reason of the signal from the vertical gyroscope operated potentiometer 21 opposing the signal introduced by the directional gyroscope through potentiometers 60 and 61. As the plane begins to approach the desired course, the signal introduced by the directional gyroscope will decrease with the result that the amplifier will supply the motor with a voltage of the proper phase to cause the ailerons to be moved in the opposite direction to that previously considered. This in turn will cause the vertical gyroscope 27 to move slider 25 back towards the mid-position. The successive decreases in the displacement of sliders 64 and 66 from their mid-position and in the displacement of slider 25 from its mid-position will continue to occur almost continuously until the plane is back on its course in straight and level flight. Thus, in the action described so far, the effect of the directional gyroscope is to introduce a signal to cause the ailerons to be deflected in such a manner as to place the plane in a bank. The ailerons are then moved back to their streamlined position, and as the plane returns to the proper course, the ailerons are deflected in the opposite direction to bring the plane back to a level position. All of these actions occur continuously.

The deviation of the aircraft from a predetermined direction of flight also affects the rudder by operating the slider 125 of the directional gyroscope potentiometer 121 of the rudder network. Again, the effect of the gyroscope is to cause slider 125 to move to the right. This causes an unbalance voltage to appear between sliders 125 and 129 of the bridge 120. Moreover, this voltage is such that during the conductive half cycle, slider 125 is negative with respect to slider 129. This causes amplifier 14 to supply to motor 11 a signal of such phase as to cause the rudder to be deflected in the manner necessary to effect the desired turn. At the same time, the slider 129 is moved to the right in an attempt to rebalance the bridge and terminate movement of the rudder. Before the rudder has moved to a position corresponding to the amount of the original deflection, however, the bank in which the plane has been placed as a result of the operation of the ailerons, causes slider 98 to be moved to the left. This tends to cause the potential of slider 98 and hence of slider 103 to become positive with respect to the lower terminal of resistor 102. In other words, the effect of this is to introduce a voltage opposing that introduced into the network by the operation of the directional gyroscope on potentiometer 121. The effect is to reduce the amount of rudder displacement and hence prevent skidding of the plane. As the plane approaches the desired course, the amount of bank is reduced as previously described so that the amount of signal supplied by bridge 95 is correspondingly reduced. Furthermore, the signal supplied by the directional gyroscope potentiometer 121 is reduced with the result that all of the potentiometers gradually approach their central position shown in the drawing.

It will be seen from the above that upon the deviation of the plane from a desired course, both the ailerons and the rudder are operated to produce a properly coordinated turn. The amount of aileron movement for a given deviation in the direction of the plane can be adjusted by adjusting the slider 86 of potentiometer 84. As slider 86 is moved upwardly, the movement of the ailerons for a given deflection of the gyroscope is increased while movement of the slider in the opposite direction has the opposite effect. It is thus possible to secure any desired ratio of aileron to rudder movement for a turn. The exponential effect obtained by the potentiometers 60 and 61 is furthermore desirable in producing a coordinated turn since as the deflection increases the proportion of aileron movement is increased. This is necessary if a coordinated turn is to be made.

Now let it be assumed that the airplane rolls about its longitudinal axis so as to cause the vertical gyroscope 27 to move slider 25 with respect to resistor 24. Let it again be assumed that the roll is in such a direction as to cause slider 25 to move to the right. This will cause slider 25 to become negative with respect to slider 29 and supply to the amplifier a signal of a predetermined phase. This in turn will cause a current of a predetermined phase to be supplied to the aileron motor 10, the resulting direction of operation of motor 10 being such as to cause the slider 29 to move to the right and to cause the ailerons to be deflected in a position tending to restore the plane to the desired attitude.

At the same time as the vertical gyroscope 27 moves slider 25, it also moves slider 98 to the right to introduce a signal into the rudder network. Again, the effect of this signal is to cause slider 98 to become negative with respect to the center tap or to cause slider 103 to become negative with respect to the lower terminal of resistor 102. This results in a signal of a predetermined phase being supplied to the rudder motor 11 to cause slider 129 to move to the right with respect to resistor 128. The effect on the rudder of the operation of the motor in this direction is to cause the rudder to be so deflected as to tend to turn the plane in a direction opposite to that which it would normally tend to turn by reason of the bank. The reason for this is that there has been no change in the direction of the plane, and if such a change is to be prevented it is necessary that the rudder oppose any tendency of the ship to change its direction by reason of the bank in which the ship has been accidentally placed. In other words, the ailerons seek to restore the ship to the proper attitude while the rudder keeps the ship from changing its course by reason of the bank in which it is placed.

A further action takes place at the same time. The vertical gyroscope 27 also acts to position slider 194 of the potentiometer 191. Regardless of which direction the slider 194 is moved, the voltage impressed upon resistor 207 is of the same polarity. As previously explained, the presence of this voltage causes amplifier 15 to supply a current of a predetermined phase to the motor 12. The phase of this current is such as to cause the motor to tilt the elevators upwardly so as to tend to raise the airplane. The need for this is that whenever a plane is placed in a bank either intentionally or by reason of some external force, the plane tends to lose altitude. By supplying a signal causing the elevators to be raised, this tendency of the ship to lose altitude is prevented. It is to be noted here that in the turn previously referred to in connection with the deviation of the airplane from the desired course, the same action took place as soon as the plane was placed into a bank. In other words, the elevators were deflected upwardly so as to minimize any tendency of the plane to lose altitude.

In each of the three networks, the movement of the control surface is limited by the action of the rebalancing potentiometer which in each case moves in a direction to rebalance the network. As the plane gradually approaches the straight and level condition it originally assumed, the deflection of the vertical gyroscope decreases so that the signal supplied to the several networks decreases with a resulting decrease in the deflection of the control surfaces. Gradually, each of the control surfaces returns to its streamlined position as the plane approaches its desired attitude.

Now let it be assumed that the aircraft alters its pitch from the desired one. This will cause the vertical gyroscope 27 to move slider 225. Let it be assumed that the plane has started to climb. This will cause slider 225 to move to the right. Under these conditions, slider 225 will become negative with respect to slider 229 so as to cause a signal to be supplied to amplifier 15, of such phase relation as to cause the motor 12 to be driven in a direction to move slider 229 to the right. This direction of rotation is such as to cause movement of the elevator downwardly so as to cause the ship to tilt back towards the desired course. As the plane is tilted back, the displacement of slider 225 will decrease with the result that the bridge will be unbalanced in the opposite direction to cause motor 12 to drive the elevators back towards their streamlined position. This action will continue until the airplane is again assuming the proper pitch.

In the action which has been described so far, no provision has been made for changing the course or pitch of the aircraft when it is desired to turn or climb. The bridge 150 provides one means for accomplishing a turn. It will be noted that the circuit traced to amplifier 13 included the upper portion of resistor 154 of potentiometer 152. Similarly, the circuit to amplifier 14 included the upper portion of resistor 156 of potentiometer 153. It will also be recalled that the voltage across resistors 154 and 156 was determined by the voltage across the terminals of bridges 150 and 260. Thus, any change made in bridge 150, for example, affects both the rudder and aileron control networks.

This action will now be described in slightly more detail. Let it be assumed that the pilot desires to turn his aircraft in a predetermined direction requiring movement of slider 168 to the right. This is accomplished by actuation of knob 173 which causes cam 175 to be rotated in a counter-clockwise direction. The movement of slider 168 to the right applies a voltage of a predetermined phase to both resistors 154 and 156. Variable portions of this voltage are thus introduced into both the aileron and rudder networks. The relative portions of this voltage introduced into the two networks is dependent upon the relative settings of sliders 155 and 157 of the trimming potentiometers 152 and 153. It will be apparent that both the rudder and aileron networks are unbalanced so as to cause movement of both of these surfaces. This movement furthermore is in such a direction as to place the plane in a banked turn in the desired direction. If some means were not provided to render the directional gyroscope temporarily inoperative in positioning the various sliders controlled by it, the directional gyroscope would immediately attempt to restore the plane to the course which it is set to maintain, and as soon as the turn control were restored to its original position, the directional gyroscope would immediately proceed to restore the plane to its original heading. This, of course, is not desirable where a turn is to be made. Consequently, means are provided for locking the mechanical connections between the directional gyroscope and the mechanical connections 67 leading to the various sliders positioned by the directional gyroscope. As soon as switch blades 176 and 177 are moved together by reason of movement of the cam 175, an energizing circuit is established to the lock 69 as follows: from the positive terminal of a battery 425 through conductors 426 and 427, switch blades 177 and 176, conductors 428 and 429, lock 69, and conductor 430 to the negative terminal of battery 425. As soon as lock 69 is thus energized, the sliders 64, 66, and 125 are locked in position, and while the gyroscope turns with respect to the plane, the mechanical connections 67 merely slip with respect to the gyroscope.

Although the directional gyroscope is locked, the vertical gyroscope is still free to move slider 25 of potentiometer 21 in the aileron network and slider 98 of potentiometer 96 in the rudder network. In each case, the movement of the slider by the vertical gyroscope is in a direction tending to restore the airplane surface to the streamlined position it had before the turn control knob was actuated. This is desirable in that as soon as the plane is placed into a bank, the ailerons should be streamlined so as to maintain the plane in exactly the desired bank. Similarly, the rudder movement should be reduced so as to avoid overshooting of the plane.

As the plane approaches the desired course, the turn control is turned back to the normal position and the various surfaces are deflected in the opposite direction. In the case of the ailerons, this has the effect of tilting the plane back to a level position so as to cause the plane to continue in horizontal and level flight. The simultaneous reversal of the rudder results in a coordinated recovery from the turn which would not be possible merely by movement of the ailerons in the opposite direction. The pilot should preferably hold the turn control slightly deflected from center so as to maintain switches 176 and 177 closed until the ship has resumed straight and level flight. Otherwise, the lock in connection with the directional gyroscope will be released while the ship is still in a turn and will immediately attempt to correct the condition with the result that the attitude of the plane maintained by the gyroscopes will be altered with respect to that which is desired.

The operation of our improved manual controller, as far as the system is concerned, will now be discussed. Let it be assumed that the pilot desires to turn in a predetermined direction. The knob 330 is grasped and moved in the plane of the paper in the direction corresponding to the desired turn. Let it be assumed that this direction is to the left so as to cause a movement of slider 266 to the right on resistor 265 as viewed in the drawing. This will cause a potential to appear between slider 266 and the center tap of resistor 265. It will be recalled that both resistors 154 and 156 are connected in series with both bridges 150 and 260. Hence, the movement of slider 266 with respect to the center tap of resistor 265 will apply a voltage across resistors 154 and 156. This voltage will be introduced into both the rudder and aileron networks in much the same manner as when the turn control was operated. The position of slider 268 will determine the magnitude of the signal that is introduced into the rudder and aileron networks for a given movement of the knob 330. The relative amount of rudder and aileron movement will be determined by the setting of sliders 155 and 157. The effect upon the operation of the rudder and ailerons will be exactly the same as in connection with operation of the turn control of bridge 150. In the case of our manual controller, it is also necessary to provide some means for energizing the lock associated with the directional gyroscope, if a change in direction is to be effected. As was noted in the description of the details of our controller, a movement of the knob 330 in the plane of the paper caused collar 380 to move downwardly to cause engagement of the switch blade 315 with switch blade 316. This results in a circuit being established to the lock 69 as follows: from the lower terminal of battery 425 through conductors 426 and 433, switch blades 315 and 316, conductors 434 and 429, lock 69, and conductor 430 to the other terminal of the battery 425. Thus, again, during the turn, the lock of the directional gyroscope is automatically rendered effective upon a turn being instituted. In the case of the directional gyroscope, it was necessary to maintain the knob slightly off center after the turn was completed in order to keep the switch blades 176 and 177 in contact making engagement until the ship returned to its straight and level position. In the present device we have provided a means to maintain this switch closed after the knob 330 has returned to its normal upright position. All that is necessary to do is to maintain the knob 330 depressed after the knob is returned to its original position by the action of the spring pressed blades 357 and 358. As long as the knob 330 is depressed, switch blades 315 and 316 are maintained closed. Hence, even though the knob is in its central position, the directional arm lock may be maintained energized until the plane is in its desired attitude. We have thus provided a means for conveniently enabling the pilot to delay placing the directional gyroscope back in control of the airplane until the ship is headed in the proper direction.

If it is desired to climb or dive, the knob 330 is grasped and moved through a plane at right angles to the plane of the paper. The movement should be in a direction corresponding to the desired change in pitch of the plane. Let it be assumed that it is desired to cause the plane to climb. In that event, the knob 330 is pushed into the plane of the paper so as to cause slider 306 to be moved to the left with respect to resistor 305 (as viewed in Figure 1). The effect of this is to cause slider 306 to become positive with respect to the center tap of resistor 305 and to introduce into the circuit a signal of such phase as to cause the motor 12 to drive the elevator upwardly. The elevator tends to assume a position corresponding to the amount of deflection of slider 316. As soon as the plane starts to climb, however, the vertical gyroscope 27 detects the climb and moves slider 225 to the left to oppose the effect of the movement of slider 306 to the right. As a result, an unbalance voltage of the opposite polarity is supplied by the amplifier to the motor 12 to return the elevator towards its streamlined position. This action continues until the elevator is back in its streamlined position. This is desirable since the desired degree of climb has been initiated and will continue until the elevator is deflected in the opposite direction. As soon as the desired climb has been completed, the knob 330 is released to permit the knob and rod assembly to return to a neutral position under the action of spring pressed blades 362 and 363. When this happens, the only signal present in the network is that introduced by the displacement of the slider 225 of the potentiometer positioned by the vertical gyroscope, and the effect of this signal is to cause the elevator to run in a direction opposite to that in which it was previously deflected. In other words, the tendency of the gyroscope is to cause the airplane to assume the pitch it possessed before the climb had been made.

In some cases, it is desirable to turn the aircraft by means of the rudder alone. This is called "skidding." One instance in which this is desirable is when a group of airplanes are flying in close formation. In such a case, it is undesirable to bank the airplane too much because when the airplane comes out of the bank it may be discovered that the planes are so close together as to cause collision. We have accordingly provided means for operating the rudder without affecting the ailerons. This is accomplished by rotation of knob 330 and hence of shaft 256 to move the slider 291 with respect to the resistor 290 of potentiometer 253. When this is done, a voltage appears between the slider 291 and the center tap of resistor 290. This voltage appears between slider 129 of the rebalancing potentiometer and the slider 157 of the trimming potentiometer, and hence is effective regardless of whether any signal is introduced in either bridges 150 or 260 to introduce a voltage in the rudder network. The phase of this voltage will be dependent upon the direction of displacement of slider 291 from the mid-position of resistor 290 which in turn is dependent upon the direction of rotation of knob 330. The result of such a rotation of knob 330 will be to cause the rudder to turn by an amount proportional to the rotation of the knob. Rotation of knob 330, as previously explained, causes downward movement of shaft 256 to effect closure of switch blades 315 and 316. When this happens the lock 69 is energized through the circuit traced previously with the result that the directional gyroscope has no effect upon any of the potentiometers normally controlled by it. As soon as the knob 330 is then returned to its original position and released, the directional gyroscope again starts to control the ship to maintain the new direction of flight. As with the turn effected by the rudder and ailerons, it is desirable to maintain the switch blades 315 and 316 closed for a brief period of time after the potentiometer has been moved back to its central position in order to permit the plane to return to the course for which it is set before placing it under the control of the gyroscope. This is done, as with normal turns, by depressing knob 330 for a short period of time after it is returned to its neutral position.

While the action described above has been in connection with only one direction of movement of the various controls, it is to be understood that in every case, where the condition changes in the opposite direction or where the manual operator is moved in the opposite direction to that considered, the effect on all of the control is opposite to that discussed. The only exception is in the effect on the elevator of the plane being placed into a bank. In this instance, the elevator is moved so as to tend to cause the plane to rise regardless of the direction in which the ship is banked.

It will be seen that we have provided an extremely simple and readily manipulable manual control for altering the course of an aircraft controlled by an automatic flight control system. With our control, by means of the operation of a single knob, the plane can be made to either turn or alter its pitch to any desired degree. By moving the control knob 330 at an angle to both planes of normal movement, the plane can be made to either turn or alter its pitch to any desired degree. By moving the control knob 330 at an angle to both planes of normal movement, the plane can be made to bank and alter its pitch simultaneously. Furthermore, by manipulation of the same knob, it is possible to maintain the lock on the directional gyroscope engaged after the knob has returned to its neutral position. In addition, our control provides means for turning by means of the rudder alone. It will furthermore be seen that we have provided a new and highly effective arrangement for operating a plurality of circuit controlling devices by a single manually manipulable member.

While we have shown a specific embodiment of our device for purposes of illustration, it is to be understood that the invention is limited only by the scope of the appended claims.

We claim as our invention:

1. In control apparatus for an aircraft having a first motor for positioning a first airfoil surface for controlling the direction of flight and a second motor for positioning an airfoil surface for controlling the pitch of the aircraft; first motor controlling means including a device adapted to respond to the deviation of an aircraft from a predetermined direction of flight and adapted to automatically control said first motor, second motor controlling means including a device adapted to respond to the deviation of the pitch of an aircraft from a predetermined attitude and adapted to automatically control said second motor, a device adapted to respond to the deviations of the aircraft about the roll axis and adapted to control said second motor, a tiltable member, means operated when said member is tilted through one plane to modify the action of said first motor controlling means so that the latter is effective to cause the aircraft to turn, and means operated when said member is tilted through another plane to modify the action of said second motor controlling means so that the latter is effective to cause the aircraft to alter its pitch.

2. In control apparatus for an aircraft having a first motor for positioning an airfoil surface for controlling the direction of flight and a second motor for positioning an airfoil surface for controlling the pitch of the aircraft; first motor controlling means including a device adapted to respond to the deviation of said aircraft from a predetermined direction of flight for automatically controlling said first motor, second motor controlling means including a device adapted to respond to the deviation of the pitch of said aircraft from a predetermined attitude and a device adapted to respond to deviations of the craft about the roll axis for automatically controlling said second motor, manually actuable means, means operated when said manually actuable means is moved in one manner to modify the action of said first motor controlling means so that the latter is effective to cause the aircraft to turn, means operated when said manually actuable means is moved in a different manner to modify the action of said second motor controlling means so that the latter is effective to cause the aircraft to alter its pitch; and spring means to cause said manually actuable means when released to return to the position assumed before initiation of the manual operation.

3. In control apparatus for an aircraft having first and second motors respectively positioning airfoil surfaces for controlling the direction of flight and the pitch of the aircraft; first motor controlling means including a device adapted to respond to the deviation of an aircraft from a predetermined direction of flight for automatically controlling said first motor, second motor controlling means including a device adapted to respond to the deviation of the pitch of an aircraft from a predetermined attitude and a device responsive to deviations of the aircraft about the roll axis for automatically controlling said second motor, a tiltable member, means operated when said member is tilted through one plane to modify the action of said first motor controlling means to adapt the latter to cause the aircraft to turn, means operated when said member is tilted through another plane to modify the action of said second motor controlling means to adapt the latter to cause the aircraft to alter its pitch, and spring means to cause said member to return to a neutral position when released.

4. In control apparatus for an aircraft having a plurality of airfoil surfaces, a first motor for so positioning a first of said airfoil surfaces as to affect the direction of flight, a second motor for so positioning a second of said airfoil surfaces as to affect the tilt of the aircraft about its longitudinal axis, and a third motor for so positioning a third of said airfoil surfaces as to affect the pitch of the aircraft, first motor controlling means including a device adapted to respond to the deviation of said aircraft from a predetermined direction of flight for automatically controlling said first motor, second motor controlling means including both a device adapted to respond to the tilting of said aircraft about its longitudinal axis and a device adapted to respond to the deviation of said aircraft from a predetermined direction of flight for controlling said second motor, third motor controlling means including a device adapted to respond to the deviation of the pitch of said aircraft from a predetermined attitude for automatically controlling said third motor, a member adapted to be tilted through two planes, means operated when said member is tilted through one plane to modify the action of both said first and second motor controlling means to adapt them to place the aircraft in a properly banked turn, and means operated when said member is tilted through another plane to modify the action of said third motor controlling means to adapt the latter to cause the aircraft to alter its pitch.

5. In control apparatus for an aircraft having first and second motors respectively positioning airfoil surfaces for controlling the direction of flight and for controlling the tilt of the aircraft about its longitudinal axis; first motor controlling means including a device adapted to respond to the deviation of said aircraft from a predetermined direction of flight for automatically controlling said first motor, second motor controlling means including both a device adapted to respond to the tilting of an aircraft about its longitudinal axis and a device adapted to respond to the deviation of an aircraft from a predetermined direction of flight for controlling said second motor, a manually movable member, means operated when said member is moved in one manner to modify the action of only said first motor controlling means to adapt the latter to turn said aircraft without appreciably banking the same, and means operated when said member is moved in a different manner to modify the action of both said first and second motor controlling means to adapt them to place the aircraft in a properly banked turn.

6. In control apparatus for an aircraft having a plurality of airfoil surfaces, a first motor for so positioning a first of said airfoil surfaces as to affect the direction of flight, a second motor for so positioning a second of said airfoil surfaces as to affect the tilt of the aircraft about its longitudinal axis, and a third motor for so positioning a third of said airfoil surfaces as to affect the pitch of the aircraft, first motor controlling means including a device adapted to respond to the deviation of said aircraft from a predetermined direction of flight for automatically controlling said first motor, second motor controlling means including both a device adapted to respond to the tilting of an aircraft about its longitudinal axis and a device adapted to respond to the deviation of an aircraft from a predetermined direction of flight for controlling said third motor, third motor controlling means including a device adapted to respond to the deviation of the pitch of an aircraft from a predetermined attitude for automatically controlling said second motor, a manually movable member, means operated when said member is moved in one manner to modify the action of only said first motor controlling means to adapt it to cause the aircraft to turn without appreciably banking the same, means operated when said member is moved in a different manner to modify the action of both said first and second motor controlling means to adapt them to place the aircraft in a properly banked turn, means operated when said member is moved in a third manner to modify the action of said third motor controlling means to adapt it to cause the aircraft to alter its pitch.

7. In control apparatus for an aircraft having a plurality of airfoil surfaces, a first motor for so positioning a first of said airfoil surfaces as to affect the direction of flight, a second motor for so positioning a second of said airfoil surfaces as to affect the tilt of the aircraft about its longitudinal axis, and a third motor for so positioning a third of said airfoil surfaces as to affect the pitch of the aircraft; first motor controlling means including a circuit controlling device adapted to respond to the deviation of said aircraft from a predetermined direction of flight for automatically controlling said first motor, second motor controlling means including both a circuit controlling device adapted to respond to the tilting of an aircraft about its longitudinal axis and a circuit controlling device adapted to respond to the deviation of an aircraft from a predetermined direction of flight for controlling said second motor, third motor controlling means including a circuit controlling device adapted to respond to the deviation of the pitch of an aircraft from a predetermined attitude for automatically controlling said third motor, a manually tiltable member, means including a circuit controlling device connected to both said first and second motor controlling means and operated when said member is tilted through one plane to modify the action of both said first and second motor controlling means to adapt them to place the aircraft in a properly banked turn, and means including a circuit controlling device connected to said third motor controlling means and operated when said member is tilted through another plane to modify the action of said third motor controlling means to adapt it to cause the aircraft to alter its pitch.

8. In combination, an aircraft having an airfoil surface for controlling the direction of flight, a motor for positioning said airfoil surface, motor controlling means including a device adapted to respond to the direction of flight of said aircraft for controlling said motor, a manually movable member, means operated when said manually movable member is moved in a predetermined manner to modify the action of said motor controlling means to cause said aircraft to turn, means rendered effective by movement of said member to render temporarily inoperative said device responsive to the direction of flight as long as said member is moved in said predetermined manner away from a normal position, and further means for temporarily maintaining said means rendered effective by movement of said member effective after return of said member to its normal position.

9. In control apparatus for an aircraft having a motor for positioning an airfoil surface for controlling the direction of flight; motor controlling means including a device adapted to respond to the direction of flight of such an aircraft and adapted to control said motor, a manually tiltable member, means operated when said manually movable member is tilted in one plane to modify the action of said motor controlling means so that the latter is effective to cause the aircraft to turn, means rendered effective by movement of said member to render temporarily inoperative said device which is adapted to respond to the direction of flight as long as said member is tilted in said one plane away from a normal position, spring means for returning said tiltable member to said normal position, and further means for temporarily maintaining said means effective by movement of said member effective after return of said member to said normal position.

10. In control apparatus for an aircraft having a motor for positioning an airfoil surface for controlling the direction of flight; motor controlling means including a gyroscope and a device normally positioned by said gyroscope through a connection capable of slipping so as to maintain a predetermined direction of flight, a manually movable member, means operated when said manually movable member is moved in a predetermined manner to modify the action of said motor controlling means to adapt the latter to cause the aircraft to turn, means rendered effective by movement of said member to lock said device with respect to said craft so as to cause slippage between said gyroscope and said device, as long as said member is moved in said predetermined manner away from a normal position, and further means for temporarily maintaining said locking means effective after return of said member to its normal position.

11. In control apparatus for an aircraft having first and second motors respectively positioning airfoil surfaces for controlling the direction of flight and the tilt of the aircraft about its longitudinal axis; first motor controlling means including a device adapted to respond to the deviation of an aircraft from a predetermined direction of flight for automatically controlling said first motor, second motor controlling means including both a device adapted to respond to the tilting of an aircraft about its longitudinal axis and a device adapted to respond to the deviation of the aircraft from a predetermined direction of flight for controlling said second motor, a manually movable member, means operated when said member is moved in one manner to modify the action of only said first motor controlling means to adapt the latter to cause an aircraft to turn without appreciably banking the same, means operated when said member is moved in a different manner to modify the action of both said first and second motor controlling means to adapt them to place the aircraft in a properly banked turn, and means effective automatically when said member is moved in said second manner to render ineffective said device which is adapted to respond to the deviation of the aircraft from a predetermined direction of flight.

12. In control apparatus for an aircraft having first and second motors respectively positioning airfoil surfaces for controlling the direction of flight and the tilt of the aircraft about its longitudinal axis; first motor controlling means including a device adapted to respond to the deviation of an aircraft from a predetermined direction of flight for automatically controlling said first motor, second motor controlling means including both a device adapted to respond to the tilting of an aircraft about its longitudinal axis and a device adapted to respond to the deviation of an aircraft from a predetermined direction of flight for controlling said second motor, a manually movable member, means operated when said member is moved in one manner to modify the action of only said first motor controlling means to adapt the latter to cause the aircraft to turn without appreciably banking the same, means operated when said member is moved in a second manner to modify the action of both said first and second motor controlling means to adapt them to place the aircraft in a properly banked turn, and means effective automatically when said member is moved in either said one or said second manner to render ineffective said device which is adapted to respond to the deviation of the aircraft from a predetermined direction of flight.

13. In control apparatus for an aircraft having first and second motors respectively positioning airfoil surfaces for controlling the direction of flight and pitch of the aircraft; first motor controlling means including a device adapted to respond to the deviation of an aircraft from a predetermined direction of flight for automatically controlling said first motor, second motor controlling means including a device adapted to respond to the deviation of the pitch of an aircraft from a predetermined attitude for automatically controlling said second motor, a manually tiltable member, means operated when said member is tilted in one direction to modify the action of said first motor controlling means to adapt the latter to cause the aircraft to turn, means operated when said member is tilted in a different direction to modify the action of said second motor controlling means to adapt the latter to cause the aircraft to alter its pitch, and means effective automatically when said member is moved in said first direction to render ineffective said device which is adapted to respond to the deviation of the aircraft from a predetermined direction of flight.

14. In control apparatus for an aircraft having first and second motors respectively positioning airfoil surfaces for controlling the direction of flight and the pitch of the aircraft; first motor controlling means including a device adapted to respond to the deviation of an aircraft from a predetermined direction of flight for automatically controlling said first motor, second motor controlling means including a device adapted to respond to the deviation of the pitch of an aircraft from a predetermined attitude for automatically controlling said second motor, a manually movable member, means operated when said member is moved in one manner to modify the action of only said first motor controlling means to adapt the latter to cause the aircraft to turn, means operated when said member is moved in a different manner to modify the action of said second motor controlling means to adapt the latter to cause the aircraft to alter its pitch, spring means effective always to return said member to a normal position when released, and means effective automatically when said member is moved in said first manner and as long as said member is away from said normal position to render ineffective said device which is adapted to respond to the deviation of the aircraft from a predetermined direction of flight.

15. In control apparatus for an aircraft having first and second motors respectively positioning airfoil surfaces for controlling the direction of flight and the pitch of the aircraft; first motor controlling means including a device adapted to respond to the deviation of an aircraft from a predetermined direction of flight for automatically controlling said first motor, second motor controlling means including a device adapted to respond to the deviation of the pitch of an aircraft from a predetermined attitude for automatically controlling said second motor, a manually movable member, means operated when said member is moved in one manner to modify the action of said first motor controlling means to adapt the latter to cause the aircraft to turn, means operated when said member is moved in a different manner to modify the action of said second motor controlling means to adapt the latter to cause the aircraft to alter its pitch, spring means effective always to return said member to a normal position when released, means effective automatically when said member is moved in said first manner and as long as said member is away from said normal position to render ineffective said device which is adapted to respond to the deviation of the aircraft from a predetermined direction of flight, and means for temporarily maintaining said last named means effective after return of said member to said normal position.

16. In a device for selectively controlling a plurality of motor controlling circuits each comprising variable impedance means; a plurality of impedance units, an adjusting means for each of said plurality of units, a member rockable about its longitudinal axis, a tiltable member pivotally secured to said rockable member about an axis perpendicular to the longitudinal axis of said rockable member so that when said tiltable member is tilted about said last-named pivotal axis, it tilts with respect to said rockable member and when said tiltable member is tilted about the axis of said rockable member, said tiltable member and rockable member are moved together, an operative connection between the adjusting means of one of said impedance units and said tiltable member for movement of said adjusting means when said member is tilted about its pivotal axis, a further operative connection between the adjusting means of another of said impedance units and said rockable member, said tiltable member being not only pivotally secured to said rockable member but also rotatable about its own longitudinal axis, and a connection between the adjusting means of another of said impedance units and said tiltable member for movement of said adjusting means upon rotation of said tiltable member about its longitudinal axis.

17. In a device for selectively controlling a plurality of electric circuits; a plurality of circuit controlling devices, a member rockable about its longitudinal axis, a tiltable member pivotally secured to said rockable member about an axis perpendicular to the longitudinal axis of said rockable member so that when said tiltable member is tilted about said last-named pivotal axis, it tilts with respect to said rockable member and when said tiltable member is tilted about the axis of said rockable member, said tiltable member and rockable member are moved together, an operative connection between one of said circuit controlling devices and said tiltable member for operation of said circuit controlling device when said member is tilted about its pivotal axis, a further operative connection between another of said circuit controlling devices and said rockable member for operation of that circuit controlling device when said rockable member is rocked, said tiltable member being longitudinally movable along its longitudinal axis with respect to said rockable member, and an operative connection between a third of said circuit controlling devices and said tiltable member for operation of said third circuit controlling device when said member is longitudinally moved.

18. In a device for selectively controlling a plurality of electric circuits; a plurality of circuit controlling devices, a member rockable about its longitudinal axis, a tiltable member pivotally secured to said rockable member about an axis perpendicular to the longitudinal axis of said rockable member so that when said tiltable member is tilted about said last-named pivotal axis, it tilts with respect to said rockable member and when said tiltable member is tilted about the axis of said rockable member, said tiltable member and rockable member are moved together, an operative connection between one of said circuit controlling devices and said tiltable member for operation of said circuit controlling device when said member is tilted about its pivotal axis, a further operative connection between another of said circuit controlling devices and said rockable member for operation of that circuit controlling device when said rockable member is rocked, said tiltable member being not only pivotally secured to said rockable member but also rotatable about and longitudinally movable along its own longitudinal axis, and connections between said tiltable member and third and fourth of said circuit controlling devices for operating said third circuit controlling device when said tiltable member is longitudinally moved and said fourth circuit controlling device when said tiltable member is rotatable about its longitudinal axis.

19. In a device for selectively controlling a plurality of circuits each including contacts and a wiper coacting with said contacts, and adjustable means for each wiper, a member rockable about an axis, a second member pivoted to said rockable member about an axis perpendicular to the said axis so that when said pivoted member pivots about its axis it rotates with respect to said rockable member and when said pivoted member is moved about the axis of the rockable member the rockable member and the pivoted member move together, an operative connection from the pivoted member to one wiper for adjustment when said pivoted member is rotated about its pivot on said rockable member, an operative connection from said rockable member to another wiper, said pivoted member being not only pivoted to said rockable member but also rotatable about its own longitudinal axis, and an operative connection from said pivoted member to a third wiper for movement of said wiper upon rotation of said pivoted member about its longitudinal axis.

20. In control apparatus for an aircraft having a first motor for positioning an airfoil surface for controlling the direction of flight and a second motor for positioning an airfoil surface for controlling the pitch of the aircraft; motor controlling means including a device adapted to respond to the deviation of an aircraft from a predetermined direction of flight for automatically controlling said first motor, second motor controlling means including a device adapted to respond to the deviation of an aircraft from a predetermined attitude for automatically controlling said second motor, means including a device adapted to respond to the deviation of the aircraft about the roll axis for controlling said second motor, a manually tiltable member, means operated when said member is tilted in one direction to modify the action of said first motor controlling means so that the latter is effective to cause the aircraft to turn, and means operated when said member is tilted in a different direction to modify the action of said second motor controlling means so that the latter is effective to cause the aircraft to alter its pitch.

21. Control apparatus for an aircraft having a first airfoil surface for controlling the direction of flight, a second airfoil surface for controlling the tilt of the aircraft about its longitudinal axis, and a third airfoil surface for controlling the pitch of the aircraft, said apparatus comprising: a manually operable member movable about three respectively perpendicular axes; means operated by said member on movement thereof about a first of said axes to cause only said first airfoil surface to move to turn the aircraft without appreciably banking the same; means operated by said member on movement thereof about a second of said axes to cause both said first and second airfoil surfaces to move to place said aircraft in a banked turn; and means operated by said member on movement thereof about a third of said axes to cause said third airfoil surface to move to cause the aircraft to alter its pitch.

ROBERT J. KUTZLER.
THEODORE J. WILSON.

REFERENCES CITED

The following references are of record in the file of this patent:

UNITED STATES PATENTS

| Number | Name | Date |
| --- | --- | --- |
| 539,863 | Faure et al. | May 28, 1895 |
| 1,239,837 | Sperry | Sept. 11, 1917 |
| 1,418,335 | Sperry | June 6, 1922 |
| 1,553,262 | Perna | Sept. 8, 1925 |
| 2,005,061 | Thomas | June 18, 1935 |
| 2,144,616 | Carlson | Jan. 24, 1939 |
| 2,162,862 | Protzen | June 20, 1939 |
| 2,190,390 | Thiry | Feb. 13, 1940 |
| 2,198,523 | Adams | Apr. 23, 1940 |
| 2,270,875 | Hanson et al. | Jan. 27, 1942 |
| 2,277,883 | Rich | Mar. 31, 1942 |
| 2,280,116 | Carlson | Apr. 21, 1942 |
| 2,379,778 | Allen | July 3, 1945 |
| 2,397,978 | Paulus et al. | Apr. 9, 1946 |
| 2,398,421 | Frische et al. | Apr. 16, 1946 |